No. 651,247. Patented June 5, 1900.
H. K. HESS.
CHEMICAL ELECTRIC GENERATOR.
(Application filed Aug. 31, 1896.)
(No Model.) 2 Sheets—Sheet 1.
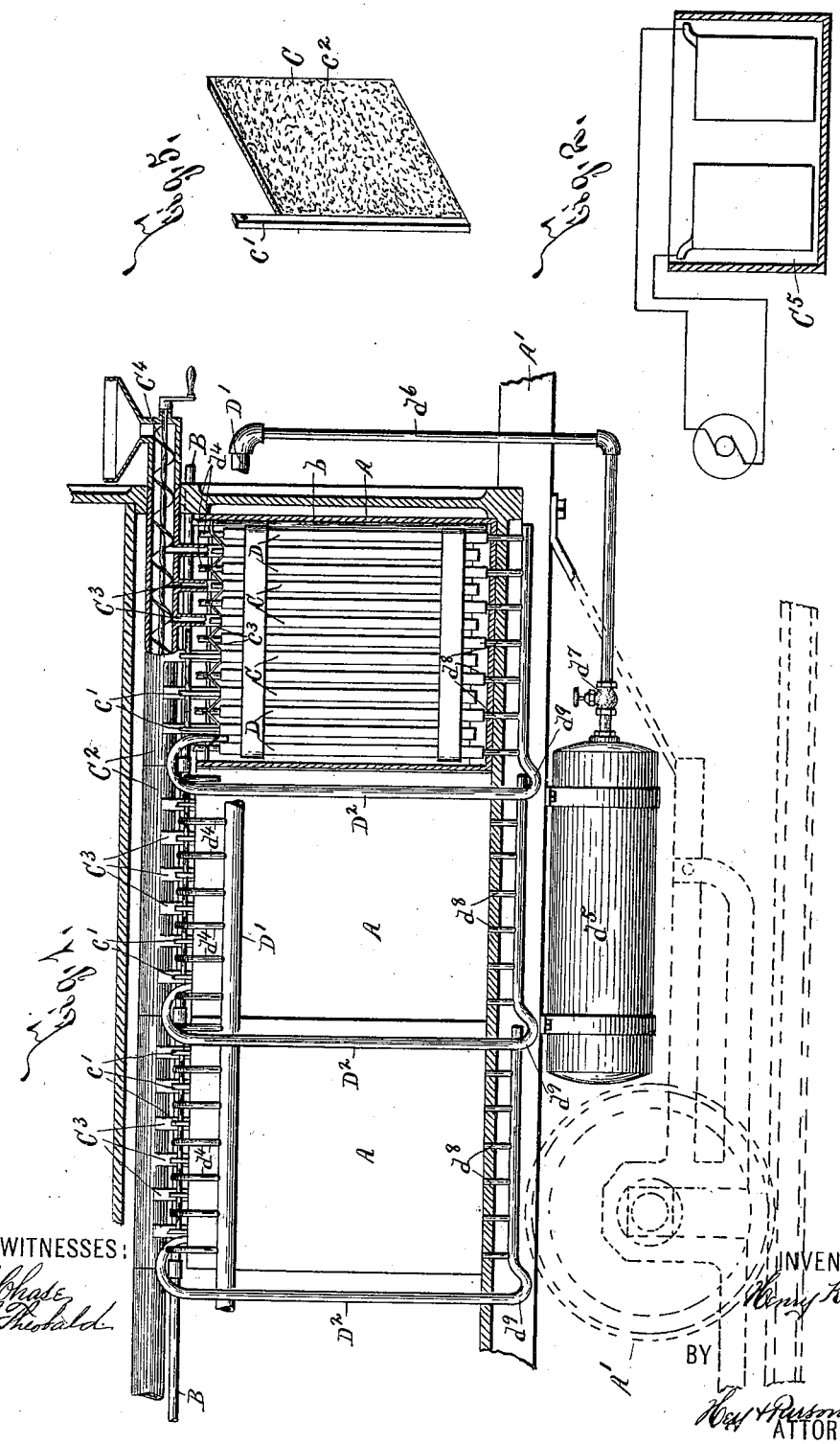

No. 651,247. Patented June 5, 1900.
H. K. HESS.
CHEMICAL ELECTRIC GENERATOR.
(Application filed Aug. 31, 1896.)
(No Model.) 2 Sheets—Sheet 2.
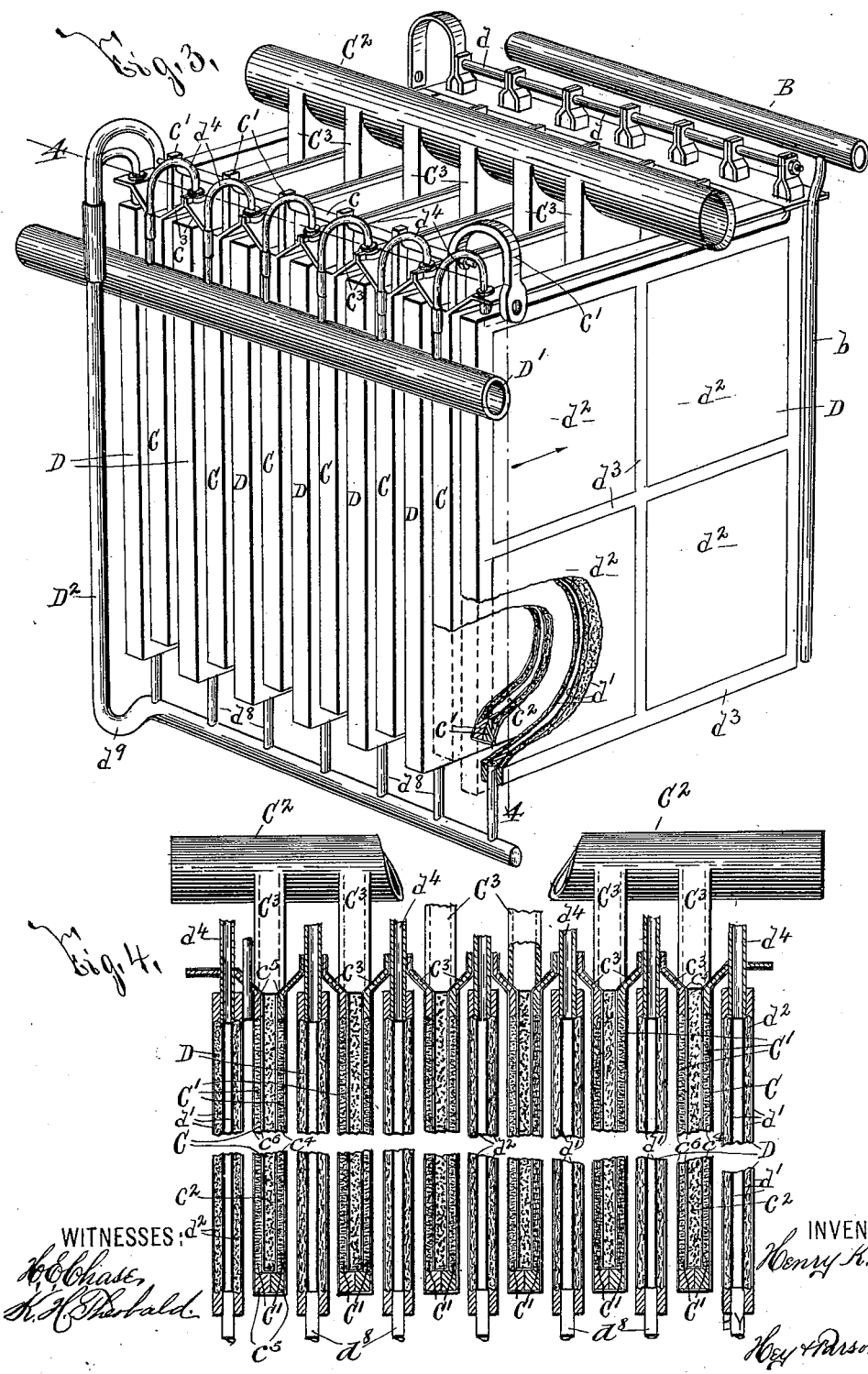

UNITED STATES PATENT OFFICE.

HENRY K. HESS, OF SYRACUSE, NEW YORK, ASSIGNOR TO HERMAN J. DERCUM, TRUSTEE, OF PHILADELPHIA, PENNSYLVANIA.

CHEMICAL ELECTRIC GENERATOR.

SPECIFICATION forming part of Letters Patent No. 651,247, dated June 5, 1900.

Application filed August 31, 1896. Serial No. 604,364. (No model.)

*To all whom it may concern:*

Be it known that I, HENRY K. HESS, of Syracuse, in the county of Onondaga, in the State of New York, have invented new and useful Improvements in Chemical Electric Generators, of which the following, taken in connection with the accompanying drawings, is a full, clear, and exact description.

My invention relates to a chemical electric generator, and has for its object the production of a simple and practical construction which is economically manufactured and is highly efficient in operation; and to this end it consists, essentially, in the combination, construction, and arrangement of the component parts of a chemical electric generator, all as hereinafter fully described, and pointed out in the claims.

In describing this invention reference is had to the accompanying drawings, forming a part of this specification, in which like letters indicate corresponding parts in all the views.

Figure 1 is an elevation, partly in section, of a portion of a vehicle and my generator operatively supported thereby. Fig. 2 is a vertical section, shown partly diagrammatically, of the apparatus for recovering the hydrogen-liberating metal from the electrolyte.
Fig. 3 is an isometric view of the internal parts of one of the cells of my chemical electric generator. Fig. 4 is a vertical section, partly broken away, taken on line 4 4, Fig. 3; and Fig. 5 is an elevation of one of the detached electrodes of my generator.

A A represent the outer casings or shells of the cells of my chemical electric generator, which casings or shells are of any desirable form, size, and construction, are composed of suitable non-electrical conducting material, as glass, hard rubber, &c., and are illustrated at Fig. 1 as operatively mounted within a portion of a vehicle, as a street-railway car A′, unnecessary to herein describe. Each casing or shell contains the elements of a cell and an electrolyte, which preferably consists of water mixed with a suitable amount of a soluble sulfate, as zinc sulfate or ammonium chlorid. A conduit B preferably feeds the electrolyte into the casings or shells A and withdraws the same therefrom and is provided with depending branches $b$, communicating with said casings or shells and capable of removable connection to suction and pressure devices (not necessary to herein illustrate and describe) for effecting the insertion and removal of the electrolyte. It is obvious, however, that the electrolyte may be otherwise fed to the casings or shells A and removed therefrom.

The elements within the casings or shells A preferably consist of positive electrodes C, arranged one in advance of the other, and negative electrodes D, interposed between the electrodes C. Suitable electrical conductors $c\ d$, respectively, connect the electrodes C D either in series or multiple, as desired. As preferably constructed each electrode C consists of an electrical conductor $c'$ and a body $c^2$ of a granular or subdivided metal, as zinc, capable of liberating hydrogen when immersed in an electrolyte containing hydrogen as one of its constituents. Each electrode C is preferably arranged within an inclosing support $C'$, which is of any desirable form, size, and construction, is generally composed of a suitable porous non-electrical conducting material, and is usually provided with diverging shoulders $c^3$ at the upper ends of its opposite sides. The contiguous faces of the shoulders $c^3$ upon adjacent sides of the supports $C'$ are generally united together for covering the tops of the electrodes D, as best seen at Figs. 1, 3, and 4. Each support $C'$ usually consists of sections $c^4$, preferably composed of earthenware, and suitable frames $c^5$, which support said sections and are usually coated by a suitable non-electric conducting material $c^6$, as asphalt, Fig. 4.

The granular or subdivided metal is fed within the supports $C'$ by a suitable pipe or conduit $C^2$, having branch passages $C^3$, discharging between the diverging shoulders $c^3$, which guide the granular or subdivided metal to the inner chambers of the supports $C'$ and prevent its passage to the terminals D. The outer end of the pipe or conduit $C^2$ may be provided with a feeding device, as a conveyer $C^4$. In the operation of my chemical electric generator the granular or subdivided metal combines with the electrolyte and passes through the porous walls of the supports $C'$ to the interior of the casings or shells A and is withdrawn through the pipe or conduit B with said electrolyte. This metal may be afterward recovered by any suitable means, as an electrolytic apparatus $C^5$, Fig. 2, the construction of which it is unnecessary to herein specifically illustrate and describe.

As usually constructed each electrode D consists of a hollow porous electrical conductor, having an active surface thereof provided with a coating $d'$, of a suitable metal, as platinum-black, for electrically coöperating with the depolarizing agent, which is preferably the oxygen of the atmosphere. Said hollow electrical conductors are usually composed of carbon or plumbago, and the coating $d'$ is generally applied to the exterior surface and the internal chambers of said conductors. The side walls of the electrical conductors of the electrodes D are usually composed of a series of sections $d^2$, supported by a frame $d^3$, Fig. 3. Air is admitted to said internal chambers from a pipe or conduit $D'$, having branch passages $d^4$, preferably discharging into the tops of said chambers. Any suitable means may be used for supplying air under pressure to the conduit $D'$, and I have here shown a storage-tank $d^5$ as connected to the pipe or conduit $D'$ by a branch pipe or conduit $d^6$, which may be provided with a valve $d^7$.

A series of branch passages $d^8$ open from the bases of the internal chambers of the electrodes D, and upright pipes or conduits $D^2$ are formed with lower substantially horizontally-arranged ends connected to the passages $d^8$ and downturned upper extremities which discharge into the outer casings or shells A. I preferably use a separate pipe or conduit $D^2$ for each cell in order to obviate any liability of short-circuiting and connect to each of said pipes or conduits all of the passages $d^8$ leading from the electrodes D of the corresponding cell. The passages $d^8$ receive the electrolyte which percolates through the walls of the electrical conductors of the electrodes D, together with the air discharged into said conductors, and the air, which is preferably under pressure, forces said electrolyte upwardly through the pipes or conduits $D^2$, whence it is discharged into the respective outer casings or shells A. To facilitate the upward passage of the electrolyte through the pipes or conduits $D^2$, suitable downwardly-extending loops $d^9$ are formed at the points of union of the lower substantially-horizontal ends of the pipes or conduits $D^2$ with the main portions of said pipes or conduits.

The operation of my chemical electric generator will be readily understood by those skilled in the art upon reference to the foregoing description and the accompanying drawings, and it will be apparent that fresh granular or subdivided metal and air may be continually added or inserted for supplying the waste or consumption of the metal and the oxygen of the air and that the electrolyte and the metal combined therewith in the operation of my generator may be withdrawn as desired. It will also be apparent that my invention is not limited to the construction of the inclosing supports for the electrodes C and that any suitable negative electrode, as that shown in my pending application, Serial No. 510,296, filed May 7, 1894, may be used instead of the electrode D.

The exact detail construction and arrangement of my chemical electric generator may be considerably varied without departing from the spirit of my invention, and hence I do not herein specifically limit myself thereto.

Having thus fully described my invention, what I claim as new, and desire to secure by Letters Patent, is—

1. The combination with a casing for containing electrolyte and a series of negative electrodes, of a series of positive electrodes interposed between the negative electrodes and each consisting of an electrical conductor and a body of granular or subdivided metal capable of liberating hydrogen when immersed in an electrolyte containing hydrogen as one of its chemically-combined constituents, inclosing supports for the bodies of granular or subdivided metal of the positive electrodes, and a conduit communicating with the inner chambers of the inclosing supports for discharging the granular or subdivided metal within said chambers, substantially as and for the purpose described.

2. The combination with an electrolyte-containing casing or shell and a series of negative electrodes arranged within the casing or shell; of a series of positive electrodes interposed between the negative electrodes and each consisting of an electrical conductor and a body of granular or subdivided metal capable of liberating hydrogen when immersed in an electrolyte containing hydrogen as one of its chemically-combined constituents, inclosing supports for the bodies of granular or subdivided metal of the positive electrodes, and a conduit provided with a series of branch passages communicating with the inner chambers of the inclosing supports for discharging the granular or subdivided metal therein, substantially as and for the purpose specified.

3. The combination with an electrolyte-containing casing or shell and a series of positive electrodes arranged within the casing or shell, and each consisting of an electrical conductor and a body of granular or subdivided metal; of inclosing supports for the bodies of granular or subdivided metal of said electrodes, a conduit provided with a series of branch passages communicating with the inner chambers of the inclosing supports for discharging the granular or subdivided metal therein, and a series of negative electrodes interposed between the former electrodes and each consisting of a hollow porous electrical conductor having an active surface thereof coated with a suitable metal for electrically coöperating with the depolarizing agent, substantially as described.

4. The combination of an electrolyte-containing casing or shell, an electrode arranged within the casing or shell, and consisting of a hollow porous electrical conductor, a pipe or conduit opening into the internal chamber of the electrical conductor for discharging the depolarizing agent thereinto, and a second pipe or conduit opening into the casing or shell and opening from the internal chamber of the electrical conductor for withdrawing the electrolyte therefrom, substantially as and for the purpose set forth.

5. The combination with an electrolyte-containing casing or shell, and a series of electrodes arranged within the casing or shell and each consisting of a hollow porous electrical conductor, a pipe or conduit having a series of branch passages opening into the internal chambers of the electrical conductors for discharging the depolarizing agent thereinto, and a second pipe or conduit arranged in a substantially-upright plane and having a downturned upper end opening into the casing or shell, and a substantially-horizontal lower end provided with a series of branch passages opening from said internal chambers for withdrawing the electrolyte therefrom, substantially as and for the purpose described.

6. The combination with an electrolyte-containing casing or shell, a series of positive electrodes each consisting of an electrical conductor and a body of granular or subdivided zinc; of inclosing supports for said bodies of granular or subdivided zinc, and negative electrodes interposed between the inclosing supports and each consisting of a hollow porous electrical conductor, a pipe or conduit having a series of branch passages opening into the internal chambers of the electrical conductors for discharging the depolarizing agent thereinto, and a second pipe opening into the casing or shell, and having a series of branch passages opening from said internal chambers for withdrawing the electrolyte therefrom, substantially as and for the purpose specified.

7. The combination with an electrode consisting of an electrical conductor and a body of granular or subdivided metal; of an inclosing support for incasing said body of granular or subdivided metal having diverging shoulders at the upper ends of its opposite sides, substantially as and for the purpose specified.

8. The combination with an electrolyte-containing casing or shell, and a series of negative electrodes arranged within the casing or shell; of a series of positive electrodes interposed between the negative electrodes, inclosing supports for the positive electrodes said supports being provided with diverging shoulders at the upper ends of their opposite sides for covering the negative electrodes, the contiguous faces of the shoulders upon adjacent sides of said supports being united together, substantially as and for the purpose set forth.

9. The combination with an electrolyte-containing casing or shell, and a series of negative electrodes arranged within the casing or shell; of a series of positive electrodes interposed between the negative electrodes, inclosing supports for the positive electrodes, said supports being provided with diverging shoulders at the upper ends of their opposite sides for covering the negative electrodes, the contiguous faces of the shoulders upon the adjacent sides of said supports being united together, and a pipe or conduit discharged between the diverging shoulders of said supports, substantially as and for the purpose described.

In testimony whereof I have hereunto signed my name, in the presence of two attesting witnesses, at Syracuse, in the county of Onondaga, in the State of New York, this 25th day of August, 1896.

HENRY K. HESS.

Witnesses:
FRANK E. YOUNG,
H. E. CHASE.